(12) United States Patent
Holman et al.

(10) Patent No.: US 8,641,067 B2
(45) Date of Patent: Feb. 4, 2014

(54) SUSPENSION UNIT

(75) Inventors: Tim Holman, Nailsea (GB); Robert D'Aubyn, Bath (GB)

(73) Assignee: Horstman Defence Systems Limited, Bath (GB)

( * ) Notice: Subject to any disclaimer, the term of this patent is extended or adjusted under 35 U.S.C. 154(b) by 106 days.

(21) Appl. No.: 13/114,104

(22) Filed: May 24, 2011

(65) Prior Publication Data

US 2011/0291369 A1    Dec. 1, 2011

(30) Foreign Application Priority Data

May 25, 2010   (GB) .................................. 1008708.8

(51) Int. Cl.
  *B62D 55/112* (2006.01)

(52) U.S. Cl.
  USPC ................. 280/124.129; 280/124.128; 180/24

(58) Field of Classification Search
  USPC ......... 280/124.1, 124.125, 124.127, 124.157, 280/124.161, 124.128, 124.129, 124.13, 280/124.131, 124.132, 124.159, 124.16; 180/6.7, 9.21, 9.48, 9.5, 9.54, 9.56, 180/190, 193, 9.1, 9.52, 22, 24
  See application file for complete search history.

(56) References Cited

U.S. PATENT DOCUMENTS

| | | | |
|---|---|---|---|
| 4,156,536 A | 5/1979 | Brandstadter | |
| 4,447,073 A * | 5/1984 | Brandstadter | 280/124.129 |
| 4,537,422 A | 8/1985 | O'Rourke | |
| 4,552,344 A * | 11/1985 | Johnson | 267/64.11 |
| 4,700,970 A * | 10/1987 | Joseph | 280/124.129 |
| 4,721,327 A | 1/1988 | Chauveau et al. | |
| 4,721,328 A * | 1/1988 | Chauveau et al. | 280/124.129 |
| 4,795,008 A | 1/1989 | Joseph et al. | |
| 4,858,736 A | 8/1989 | Arnaud et al. | |
| 5,105,918 A | 4/1992 | Hagiwara et al. | |
| 5,183,287 A | 2/1993 | VanSweden | |
| 5,324,065 A | 6/1994 | Derrien et al. | |

FOREIGN PATENT DOCUMENTS

| | | |
|---|---|---|
| DE | 3637387 A1 | 5/1988 |
| EP | 0450942 A2 | 10/1991 |
| EP | 0525957 A1 | 2/1993 |
| EP | 1418364 A1 | 5/2004 |
| GB | 1597922 A | 9/1981 |
| GB | 2313203 A | 11/1997 |
| JP | 62011156 A | 1/1987 |
| JP | 2009101864 A | 5/2009 |
| WO | 2004076211 A1 | 9/2004 |

OTHER PUBLICATIONS

UK Search Report Issued on Aug. 23, 2010 for Application No. GB1008709.6, 1 page.
UK Search Report Issued on Feb. 10, 2011 for Application No. GB1008705.4, 1 page.

(Continued)

*Primary Examiner* — James English
(74) *Attorney, Agent, or Firm* — Gesmer Updegrove LLP

(57) ABSTRACT

A suspension unit is disclosed comprising: a hub 6; a bearing sleeve 24 eccentrically mounted within the hub 6; a crank pin 22 rotatably received within the bearing sleeve 24; and a connecting rod 20, a first end 28 of which is connected for rotation with the crank pin 22 over a connecting area 26 that comprises less than a complete circumference of the crank pin 22; the bearing sleeve 24 comprising a slot 52 through which the connecting rod 20 extends from the first 28 end to a second end.

17 Claims, 3 Drawing Sheets

(56) References Cited

OTHER PUBLICATIONS

UK Search Report Issued on Aug. 18, 2010 for Application No. GB1008708.8, 1 page.
UK Search Report Issued on Aug. 16, 2010 for Application No. GB1008706.2, 1 page.
UK Search Report Issued on Sep. 20, 2011 for Application No. GB 1108677.4, 1 page.
UK Search Report Issued on Aug. 17, 2010 for Application No. GB1008707.0, 1 page.

* cited by examiner

SUSPENSION UNIT

PRIORITY

The present application claims the benefit of British Patent Application No. 1008708.8 filed on 25 May 2010, which is incorporated herein in its entirety.

BACKGROUND

This invention relates to a suspension unit and particularly, but not exclusively, relates to a suspension unit for use on a tracked vehicle.

A tracked vehicle has a track extending around a series of track guide wheels. At least some of the guide wheels support the weight of the vehicle hull on the section of the track which is in contact with the ground. In this specification, the expression "hull" is used to refer to the main body of the vehicle. The hull serves the same purpose as the chassis of a conventional vehicle, whether or not the chassis is constituted wholly or partially by the bodywork of the vehicle. Consequently, in the context of the present invention, the word "hull" is considered to be equivalent to a vehicle chassis.

The track guide wheels which support the weight of the vehicle on the ground need to be connected to the vehicle hull by a suspension arrangement which enables the track guide wheel to move up and down relative to the hull.

A suspension system is known in which the suspension system comprises an arm which is pivotable relative to the hull about a pivot axis. A wheel-supporting shaft is carried by the arm at a position away from the pivot axis, for supporting a track guide wheel. A resilient damping arrangement is accommodated within the arm for providing damped resilient resistance to deflection of the arm away from a static position in a direction corresponding to movement of the hull towards the ground.

At least one displaceable element of the resilient damping arrangement is connected to the hull via a connecting rod that is connected for rotation with a crank pin. The crank pin is carried in a hub that is rigidly connected to the hull of the vehicle. In conventional systems, the crank pin is supported for rotation within the hub by two simple cylindrical bearing shells spaced equally in the axial direction about a central region, over which the connecting rod is connected to the crank pin. This connection is achieved by an end of the connecting rod completely encircling the crank pin. Load is transmitted from the connecting rod through the crank pin and is reacted through the bearing shells to the surrounding structure. It is essential that the bearing shells of such a system are sufficiently large to achieve unit loading of the bearing shells that is within the load capabilities of the bearing shell material. In addition, the crank pin must be sufficiently large in diameter to withstand the bending loads applied when the force transmitted through the connecting rod is reacted by the bearing shells.

In certain applications, the space claim of each individual component is highly restricted. In addition, the load patterns experienced by the components may be substantially consistent, for example compression only loading through the connecting rod. In such applications in particular, there exists a need to provide a reduced diameter crank pin while still maintaining crank pin integrity and unit bearing loading within the bearing material rated capabilities.

SUMMARY

According to an aspect of the present invention, there is provided a suspension unit comprising a hub, a bearing sleeve eccentrically mounted within the hub, a crank pin rotatably received within the bearing sleeve and a connecting rod, a first end of which is connected for rotation with the crank pin over a connecting area that comprises less than a complete circumference of the crank pin, the bearing sleeve comprising a slot through which the connecting rod extends from the first end to a second end.

By connecting the connecting rod to the crank pin over only a part of the circumference of the crank pin, the crank pin can be supported within a single bearing sleeve having a slot to accommodate the connection with the connecting rod. The slot will necessarily be substantially on the side of the bearing on which tensile loads are reacted, ensuring that on the side of the bearing that reacts compressive loads, a greater amount of bearing material is available to react those loads. In addition, bearing material is available to react the compressive loads transmitted by the connecting rod along the axis of application of those loads, thus reducing the bending loads applied to the crank pin. The reduction in bending loads, together with the increase in available bearing material to react compressive loads, means that the diameter of the crank pin and bearing sleeve can be reduced without any loss of performance either of the crank pin or of the bearing sleeve.

The connecting rod may be connected to the crank pin with a longitudinal axis of the connecting rod extending substantially perpendicularly to an axis of rotation of the crank pin.

The connecting rod may be connected to the crank pin in a central region of the crank pin, distant from each opposed end of the crank pin. For example, the connecting rod may be connected to the crank pin at an axial centre of the crank pin, such that a longitudinal axis of the connecting rod bisects the crank pin.

The connecting area may trace an arc of between 90 and 180 degrees about the circumference of the crank pin.

The slot in the bearing sleeve may be circumferential and may trace an angle of between 150 and 270 degrees about a circumference of the bearing sleeve.

The dimensions of the connecting area and bearing slot may ensure that relative rotation is available between the connected crank pin and connecting rod and the bearing sleeve.

The angle of relative rotation between the connected crank pin and connecting rod and the bearing sleeve may be between 1 and 180 degrees.

The first end of the connecting rod may comprise a connecting surface and a mounting protrusion. The connecting rod may be connected to the crank pin via an attachment mechanism which may pass through the mounting protrusion into the crank pin. The attachment mechanism may pass through a centre of rotation of the crank pin.

The attachment mechanism may comprise a bolt, and/or pin that may be received in a corresponding bore formed in the crank pin. The bore may be a blind bore and may for example comprise an internal thread. In alternative embodiments, the attachment mechanism may comprise a plate that may be received in a slot formed in the crank pin. The attachment mechanism may be integrally formed with either the connecting rod or the crank pin.

The bearing sleeve may encompass a complete axial length of the crank pin.

The suspension unit may further comprise: a connecting element secured to the hub and adapted to be secured to a vehicle chassis, a suspension arm mounted on the hub for pivoting movement about an axis of the hub, a wheel supporting shaft provided on the suspension arm, the wheel supporting shaft being parallel to, and spaced from, the axis of the hub, and a resilient damping arrangement accommodated within the suspension arm, the second end of the connecting rod being connected to at least one moveable member within the resilient damping unit.

According to another aspect of the present invention, there is provided a vehicle having a suspension unit in accordance with the first aspect of the present invention.

The vehicle may be a tracked vehicle and the suspension unit may support a track guide wheel of the vehicle.

BRIEF DESCRIPTION OF THE DRAWINGS

For a better understanding of the present invention, and to show more clearly how it may be carried into effect, reference will now be made by way of example to the following drawings, in which:—

DETAILED DESCRIPTION

Figure 1:
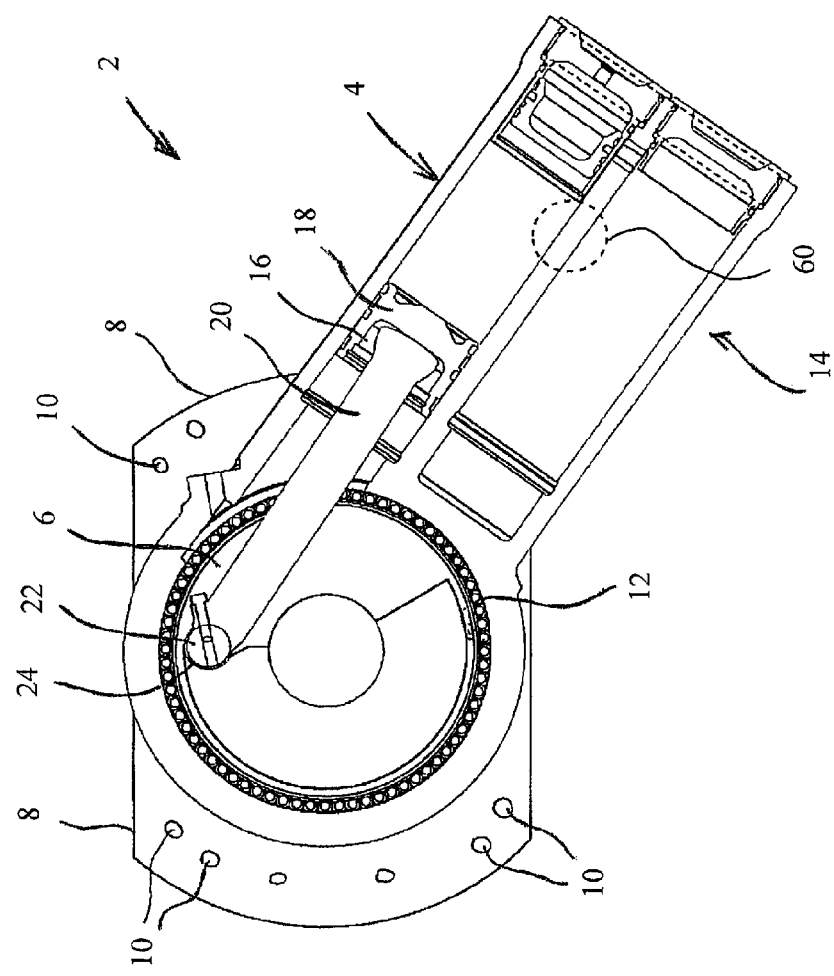
FIG. 1 illustrates a suspension arm of a suspension unit.

With reference to FIG. 1, a suspension unit 2 comprises a suspension arm 4, which is rotatable at one end about a suspension hub 6 comprising a body having a substantially cylindrical outer surface. At the other end of the suspension arm 4 is mounted a wheel supporting shaft shown at 60 in FIG. 1.

When the suspension unit 2 is mounted on a vehicle, the suspension hub 6 is secured to the vehicle hull via a connecting element in the form of a flange 8. Bolts (not shown) extend through plain holes 10 in the flanges 8 to engage threaded holes in the vehicle hull (not shown). The holes 10 in the flanges 8 are arranged in a pattern which corresponds to the holes in the vehicle hull.

The cylindrical outer surface of the suspension hub 6 is received within a cylindrical opening 12 in the suspension arm 4. Thus, in use, the suspension hub 6 is secured to the vehicle hull by way of the flange 8 and the suspension arm 4 can pivot about the central axis of the suspension hub axis defined by the cooperating cylindrical surfaces of the body of the suspension hub 6 and the cylindrical opening 12.

The suspension arm 4 accommodates a resilient damping arrangement 14 that comprises at least one displaceable element in the form of a piston 16 which is slidably disposed within a cylinder 18. The piston 16 is connected via a connecting rod 20 to a crank pin 22 that is eccentrically mounted in the hub 6. The crank pin 22 is mounted in the hub 6 via a bearing sleeve 24, within which the crank pin 22 is rotatably received.

Figure 2:
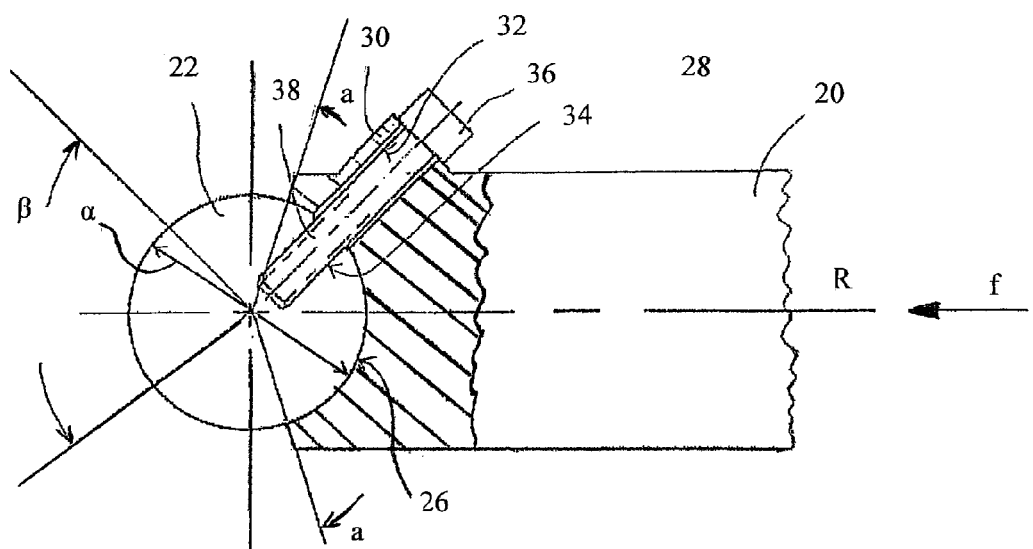
FIG. 2 is a sectional view of a connecting rod and crank pin.
Figure 3:
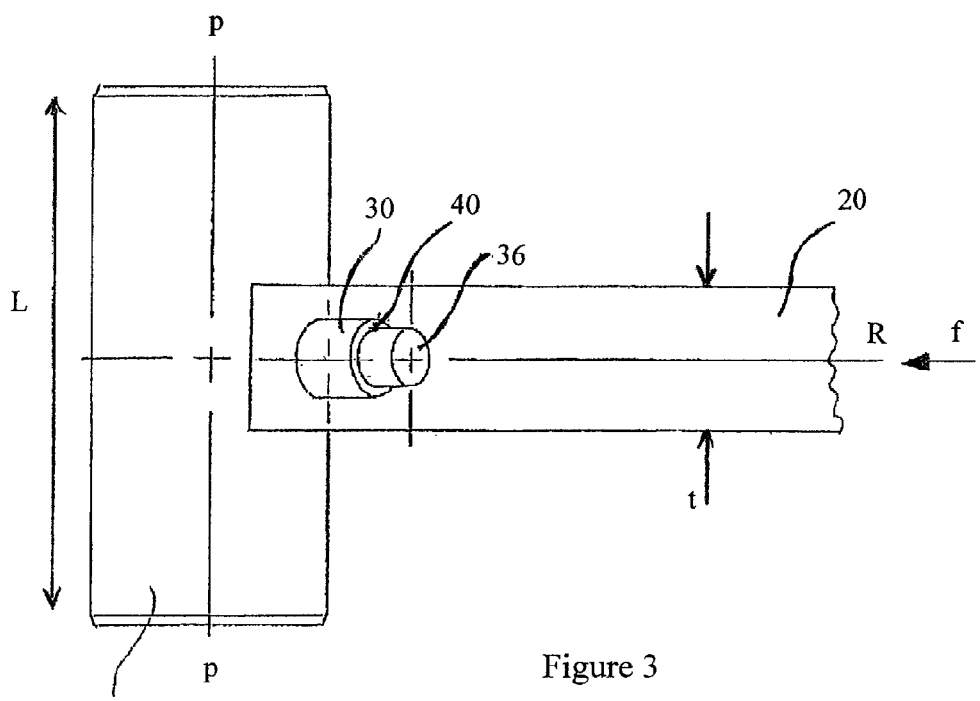
FIG. 3 is a side view of the connecting rod and crank pin of FIG. 2.
Figure 5:
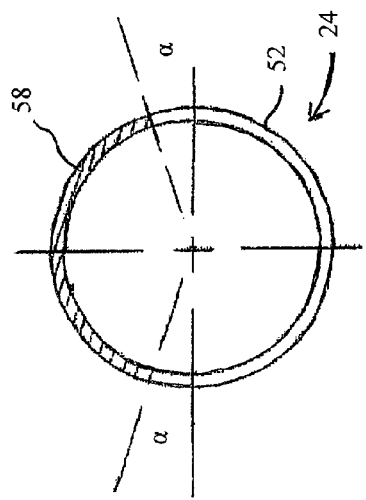
FIG. 5 is a sectional view along the line VV in FIG. 4.
Figure 7:
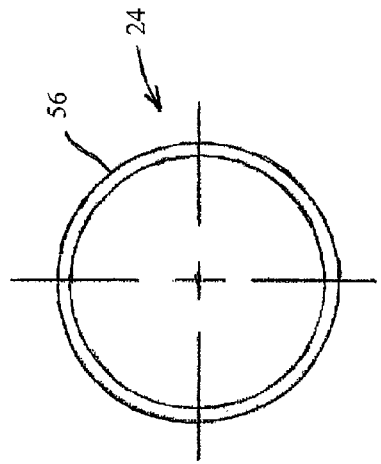
FIG. 7 is an end view of the bearing sleeve of FIG. 4.
Figure 4:
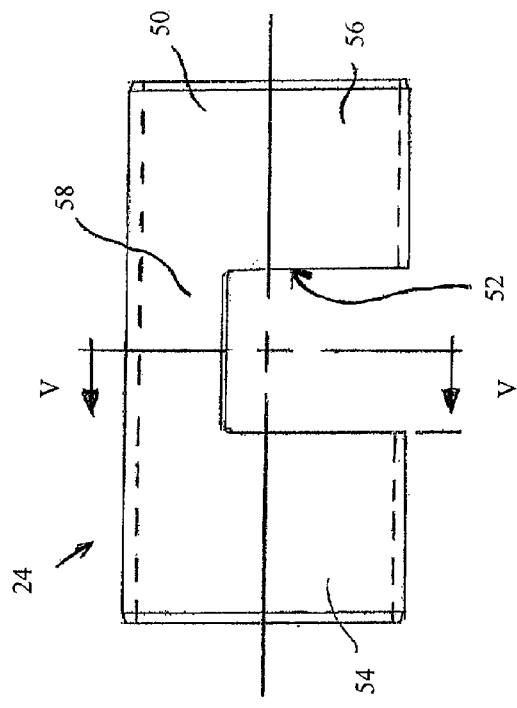
FIG. 4 is a side view of a bearing sleeve.
Figure 6:
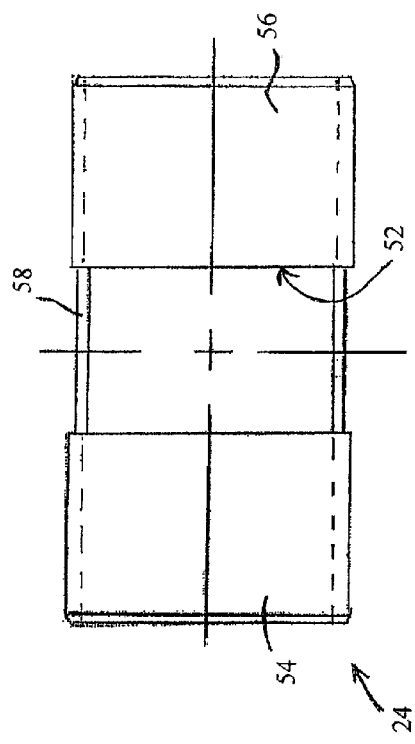
FIG. 6 is a plan view of the bearing sleeve of FIG. 4.

With reference also to FIGS. 2 and 3, the crank pin 22 comprises a cylindrical pin having an axial length l and a diameter d. A first end 28 of the connecting rod 20 is connected to the crank pin 22 such that a longitudinal axis R of the connecting rod 20 is substantially perpendicular to a longitudinal axis P of the length crank pin 22. The connecting rod 20 is connected to the crank pin 22 in a central region of the crank pin 22, such that the axis R of the connecting rod 20 substantially bisects the crank pin 22, as illustrated particularly in FIG. 3.

The connecting rod 20 is connected to the crank pin 22 over a connecting surface or area 26 that extends over the thickness t of the connecting rod 20 in the axial direction of the crank pin 22 and extends over an arc a of the circumference of the crank pin 22. The arc a is preferably greater than 90 degrees and less than 180 degrees. The angle over which the arc a extends may be varied according to a particular application for which the suspension unit 2 is required. According to one embodiment, the arc a extends over an angle of approximately 140 degrees. In this manner, the connecting rod 20 is connected to the crank pin 22 on one side only of the crank pin 22, leaving at least one half of the circumference of the crank pin 22, at the axial region of the pin where the connecting rod 20 is connected, free from additional encumbrance or thickness.

The first end 28 of the connecting rod 20 comprises a mounting protrusion 30 that projects from a surface of the connecting rod 20. A bore 32 extends through the mounting protrusion 30 and opens onto the connecting surface 26 of the connecting rod 20, over which the connecting rod 20 is connected to the crank pin 22. A corresponding blind bore 34 extends into the crank pin 22 from a connecting surface of the crank pin 22. In use, an attachment mechanism in the form of a bolt 38 is driven into the cooperating bores 32, 34 of the mounting protrusion 30 and crank pin 22 until a head 36 of the bolt engages an annular shoulder 40 of the mounting protrusion 30. The bolt 38 fixedly connects the connecting rod 20 and the crank pin 22 such that the crank pin 22 and connecting rod 20 rotate as a single unit. In an alternative embodiment (not shown), an attachment mechanism in the form of a pin or extending plate may be employed. The attachment mechanism may be engaged in corresponding bores or slots formed in the mounting protrusion 30 and crank pin 22. Additional alternative arrangements for connecting the connecting rod 20 and crank pin 22 could also be contemplated.

With reference to FIGS. 4 to 7, the bearing sleeve 24, within which the crank pin 22 is rotatably received, comprises a plane cylindrical sleeve 50 having a circumferential slot 52 extending over a central region of the bearing 24. The slot 52 divides the bearing 24 into two substantially equally sized cylindrical bearing shells 54, 56, connected by a part cylindrical bridge portion 58. The cylindrical slot 52 extends over more than 180 degrees and may extend over approximately 270 degrees. In one embodiment, the slot 52 may extend over approximately 210 degrees. The angle $\alpha$, by which the slot exceeds 180 degrees on each side of a midline may thus be between 1 and 45 degrees and may for example be approximately 10 degrees. The width of the slot 52 is sufficient to accommodate at least the thickness t of the connecting rod 20, as discussed further below. A length L of the bearing sleeve 24 is at least equal to the length l of the crank pin 22.

In use, the crank pin 22 is received within the bearing sleeve 24 and the connecting rod 20 is connected to the crank pin 22 via the bolt 38 and cooperating bores 32, 34 or other attachment mechanism as described above. The connecting rod 20 thus extends away from the crank pin 22, through the slot 52 in the bearing sleeve 24, towards its second end (not shown). The circumferential extent of the slot 52 and the thickness t of the connecting rod 20 are such as to permit at least 60 degrees of relative rotation between the bearing 24 and crank pin 22/connecting rod 20, when the components are assembled together.

As discussed above, the connecting rod 20 transmits force through the crank pin to be reacted through the bearing shells to the surrounding structure. Compressive loads F transmitted through the connecting rod 20 are reacted by the continuous bearing sleeve 24 over the entire length/of the crank pin, as seen in FIG. 3. The part cylindrical bridge portion 58 of the bearing sleeve 24 provides direct, in line support to the crank pin 22 over an arcuate region encompassing an angle $\beta$ corresponding to the arcuate extent of the bridge portion 58, as illustrated in FIG. 2. The described apparatus thus increases the proportion of the bearing that is available to react compressive forces. This increase in available area enables the actual size of the bearing sleeve 24, and hence the crank pin 22, to be reduced. In addition, by directly supporting the crank pin 22 in the line of action of the connecting rod 20, bending loads applied to the crank pin 22 are reduced, meaning the diameter of the crank pin 22 can be reduced without compromising its structural integrity.

The apparatus of the present invention thus provides a reduced space claim for the connecting rod, crank pin and bearing system of a suspension unit while maintaining unit loading within current bearing material limits. The reduced crank pin size is obtained by attaching the connecting rod, which inputs load to the crank pin and bearing, to one side only of the crank pin as shown particularly in FIGS. 2 and 3. This allows the bearing sleeve to be continuous across the length of the crank pin on the compression loading side. The bearing sleeve has a slot in the tensile loading side to allow the connecting rod to move within the range of motion needed (typically 60 degrees). Advantages of the present invention include an increase in the proportion of the material of the bearing sleeve available to react against the compressive loads, as well as reduced bending loads on the crank pin. It has been found that crank pin diameter can be reduced by up to 30% using the present invention, with no loss of strength or performance of the crank pin and bearing system.

What is claimed is:

1. A suspension unit comprising:
   a hub;
   a bearing sleeve eccentrically mounted within the hub;
   a crank pin rotatably received within the bearing sleeve; and
   a connecting rod, a first end of which is connected for rotation with the crank pin over a connecting area that comprises less than a complete circumference of the crank pin;
   the bearing sleeve comprising a slot through which the connecting rod extends from the first end to a second end.

2. The suspension unit as claimed in claim 1, wherein the connecting rod is connected to the crank pin with a longitudinal axis of the connecting rod extending substantially perpendicularly to an axis of rotation of the crank pin.

3. The suspension unit as claimed in claim 1, wherein the connecting rod is connected to the crank pin in a central region of the crank pin, distant from each opposed end of the crank pin.

4. The connecting rod as claimed in claim 1, wherein the connecting rod is connected to the crank pin at an axial centre of the crank pin, such that a longitudinal axis of the connecting rod bisects the crank pin.

5. The suspension unit as claimed in claim 1, wherein the connecting area traces an arc of between 90 and 180 degrees about the circumference of the crank pin.

6. The suspension unit as claimed in claim 1, wherein the slot in the bearing sleeve is circumferential.

7. The suspension unit as claimed in claim 6, wherein the slot traces an angle of between 150 and 270 degrees about a circumference of the bearing sleeve.

8. The suspension unit as claimed in claim 1, wherein relative rotation is available between the connected crank pin and connecting rod and the bearing sleeve.

9. The suspension unit as claimed in claim 8, wherein the angle of relative rotation between the connected crank pin and connecting rod and the bearing sleeve is between 1 and 180 degrees.

10. The suspension unit as claimed in claim 1, wherein the first end of the connecting rod comprises a connecting surface and a mounting protrusion.

11. The suspension unit as claimed in claim 10, wherein the connecting rod is connected to the crank pin via an attachment mechanism.

12. The suspension unit as claimed in claim 11, wherein the attachment mechanism passes through the mounting protrusion into the crank pin.

13. The suspension unit as claimed in claim 11, wherein the attachment mechanism comprises at least one of a bolt and a pin.

14. The suspension unit as claimed in claim 1, wherein the bearing sleeve encompasses a complete axial length of the crank pin.

15. The suspension unit as claimed in claim 1, further comprising:
   a connecting element secured to the hub and adapted to be secured to a vehicle chassis;
   a suspension arm mounted on the hub for pivoting movement about an axis of the hub, the suspension arm being adapted to support a wheel; and
   a resilient damping arrangement accommodated within the suspension arm, the second end of the connecting rod being connected to at least one moveable member within the resilient damping unit.

16. A vehicle having the suspension unit of claim 1.

17. The vehicle as claimed in claim 16, wherein the vehicle is a tracked vehicle.

* * * * *